Nov. 23, 1937.  D. B. BAKER ET AL  2,099,790
MOUNTING OF AUXILIARIES FOR TRACTOR ENGINES
Filed May 16, 1936  3 Sheets-Sheet 1

Nov. 23, 1937.    D. B. BAKER ET AL    2,099,790
MOUNTING OF AUXILIARIES FOR TRACTOR ENGINES
Filed May 16, 1936    3 Sheets-Sheet 2

Inventors
D. B. Baker
C. R. Rogers
N. O. Panzegrau
By [signature]
Atty.

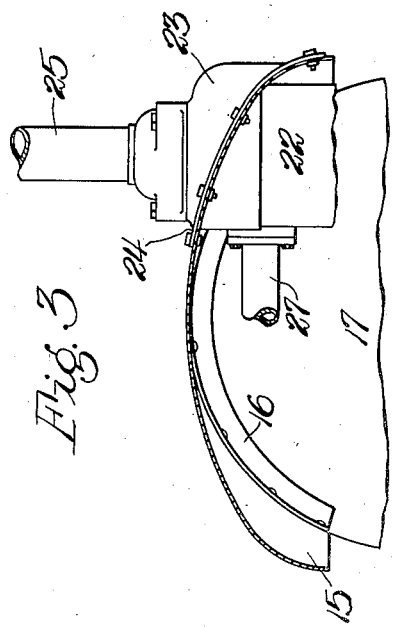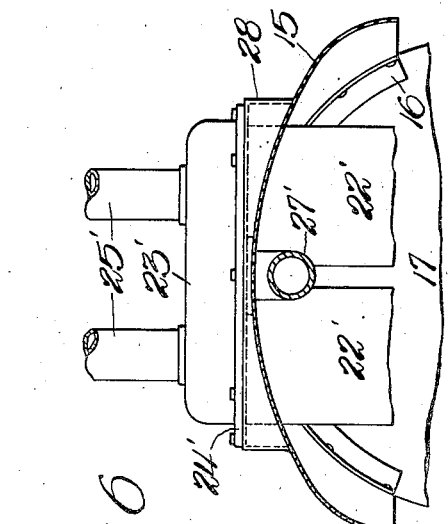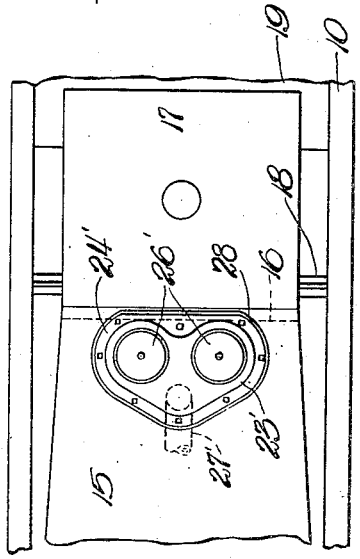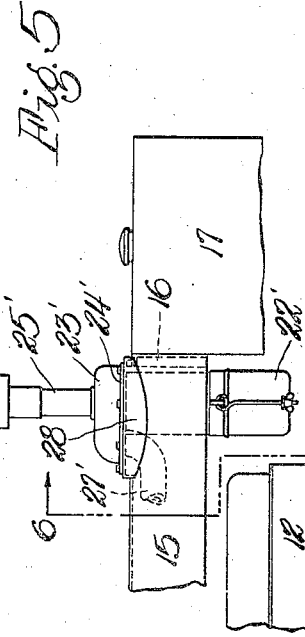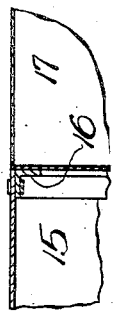

Patented Nov. 23, 1937

2,099,790

UNITED STATES PATENT OFFICE 2,099,790

MOUNTING OF AUXILIARIES FOR TRACTOR ENGINES

David B. Baker, Riverside, Clifford R. Rogers, Oak Park, and Norman O. Panzegrau, Chicago, Ill., assignors to International Harvester Company, a corporation of New Jersey Application May 16, 1936, Serial No. 80,054

20 Claims. (Cl. 180—54)

The invention relates to the mounting of auxiliary devices, such as air cleaners, for engines as used in tractors.

It is common practice at the present time to employ an air cleaner to remove dirt and dust from the air that is to be used in the engine of a tractor for forming the fuel mixture. The air cleaner must, of course, be of ample size and capacity for a given size of engine, and, consequently, where large size engines are used, as in heavy duty tractors, a very large size of air cleaner must be employed. This is especially true when the engine is of the Diesel type. A real problem is encountered in providing a convenient place in proximity to the engine for mounting such a large air cleaner, for it should not be mounted in a place where it might be injured by coming in contact with low hanging branches of trees or the like; nor should it be located where it is apt to be bumped; nor should it be located where it would, because of its large size, constitute an impediment to good vision of the tractioneer who operates the tractor.

In accordance with the teaching of the present invention, two smaller air cleaners, having the same capacity as a large air cleaner, are coupled in parallel and unified by a manifold or header, which is carried securely in the hood for a front mounted engine at a point between the rear end of a longitudinally disposed engine and a fuel tank therefor disposed at the rear of the engine and on which the rear end of the hood may be mounted; said air cleaners thus hanging from the hood between the sides thereof, so that the tractioneer can scan along the sides of the hood from his rear mounted seat with a clear line of vision on either side of the hood.

The main object of the invention is to provide an improved air cleaner assembly for tractors and the like power plants.

Another object is to provide an improved mounting for air cleaners.

Other important objects will become apparent to those skilled in this art as the disclosure is more fully made.

In the accompanying drawings illustrating preferred examples of the invention,—

Figure 3 is an enlarged cross-sectional view through the hood, taken along the line 3—3 of Figure 2, looking in the direction of the arrows;

Figure 4 is a fragmentary, plan view of a modified arrangement for the air cleaners;

Figure 5 is a side elevational view, showing part of the structure as it appears in Figure 4;

Figure 6 is an enlarged cross-sectional view through the hood of the modified arrangement, taken along the line 6—6 of Figure 5, looking in the direction of the arrows; and, Figure 7 is a detail, fragmentary, sectional view taken along the line 7—7 of Figure 2.

The tractor shown by way of example is of the crawler type, and embodies a central, longitudinal, main frame 10 suspended in the usual way on a pair of side crawler traction devices 11.

Figure 2:
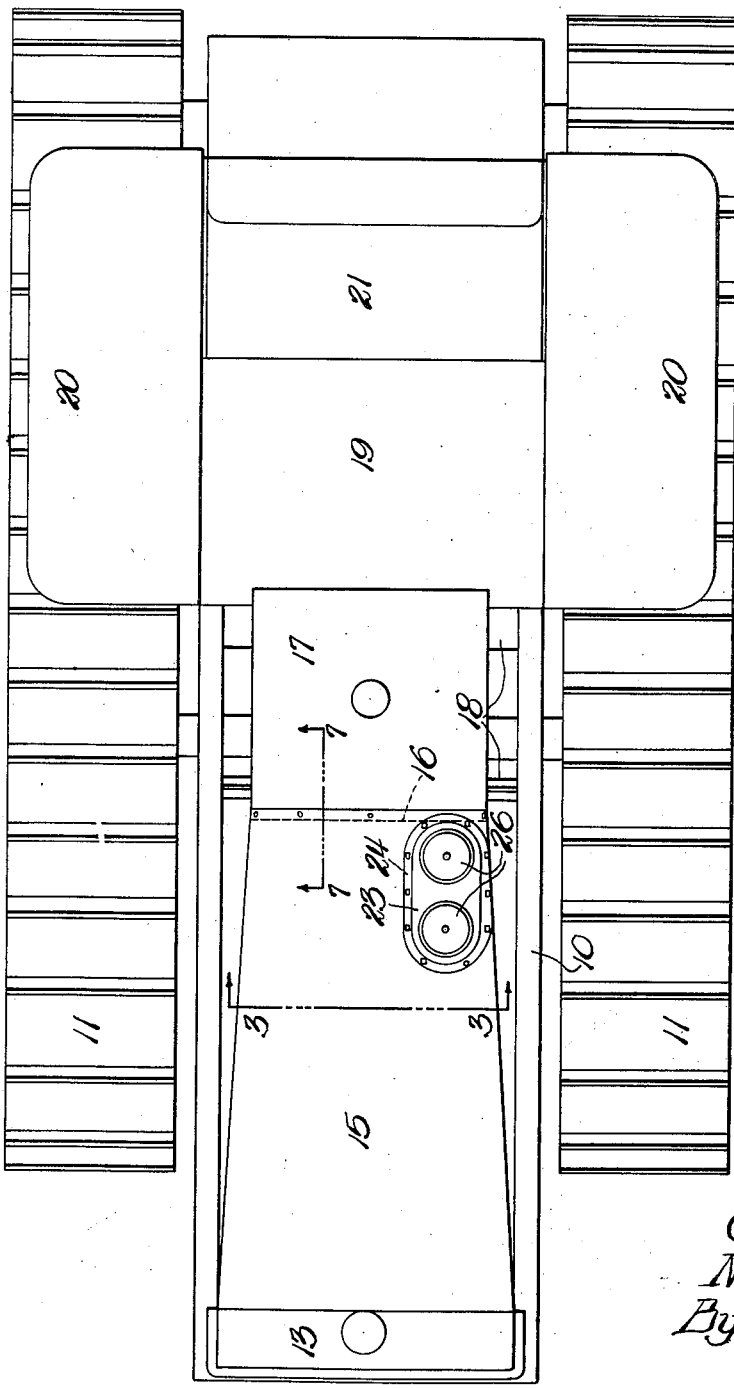
Figure 2 is a general plan view of the structure shown in Figure 1.

The front end of the frame carries an engine 12 of the upright in-line type, and in the usual location, and in advance thereof is a radiator 13 including a rearwardly extending header portion 14 carrying the front end of an engine hood 15. Said hood at its front end is of substantially the same width as the radiator, but tapers inwardly at its side edges rearwardly, as shown in Figure 2, to a narrow width, rear end portion substantially less than the width of the front portion.

This narrow, rear end of the hood on its under side carries, by means of rivets, or the like, an arcuate angle bar 16 having a vertical flange, which is firmly connected, as by welding, to the front vertical end wall of a fuel tank 17.

This fuel tank is cylindrical with its axis arranged longitudinally and with the side edges of the tank, because of its diameter, continuing rearwardly from the side edges of the hood. In other words, the tank is no wider than the width of the rear end of the hood. This tank 17 is appropriately carried in a bracket structure 18 supported in any convenient way on the tractor main frame 10. The rear end wall of the tank delineates the front end of an operator's platform or compartment 19 between the two fenders 20, and at the rear of which is carried a seat 21 for the operator.

The rearwardly narrowing hood, merging into a narrow fuel tank as described, makes for clear vision ahead along the sides of the hood from the driver's vantage point on the rear mounted seat 21, as can readily be appreciated. This is a most desirable characteristic and it should not be despoiled by any haphazard mounting of engine auxiliaries, such for example as an air cleaner. Accordingly, an improved air cleaner assembly and mounting is provided, whereby, at least, two smaller air cleaners are arranged in parallel with individual air inlets and a common clean air delivery conduit in such a manner that a common mounting bracket or the like may be used to hang or support the air cleaner unit in and from the hood for the engine, and independently of the latter. A most desirable location for the mounting is between the sides of the hood and between the rear end of the engine and the front wall of the fuel tank.

Figure 1:
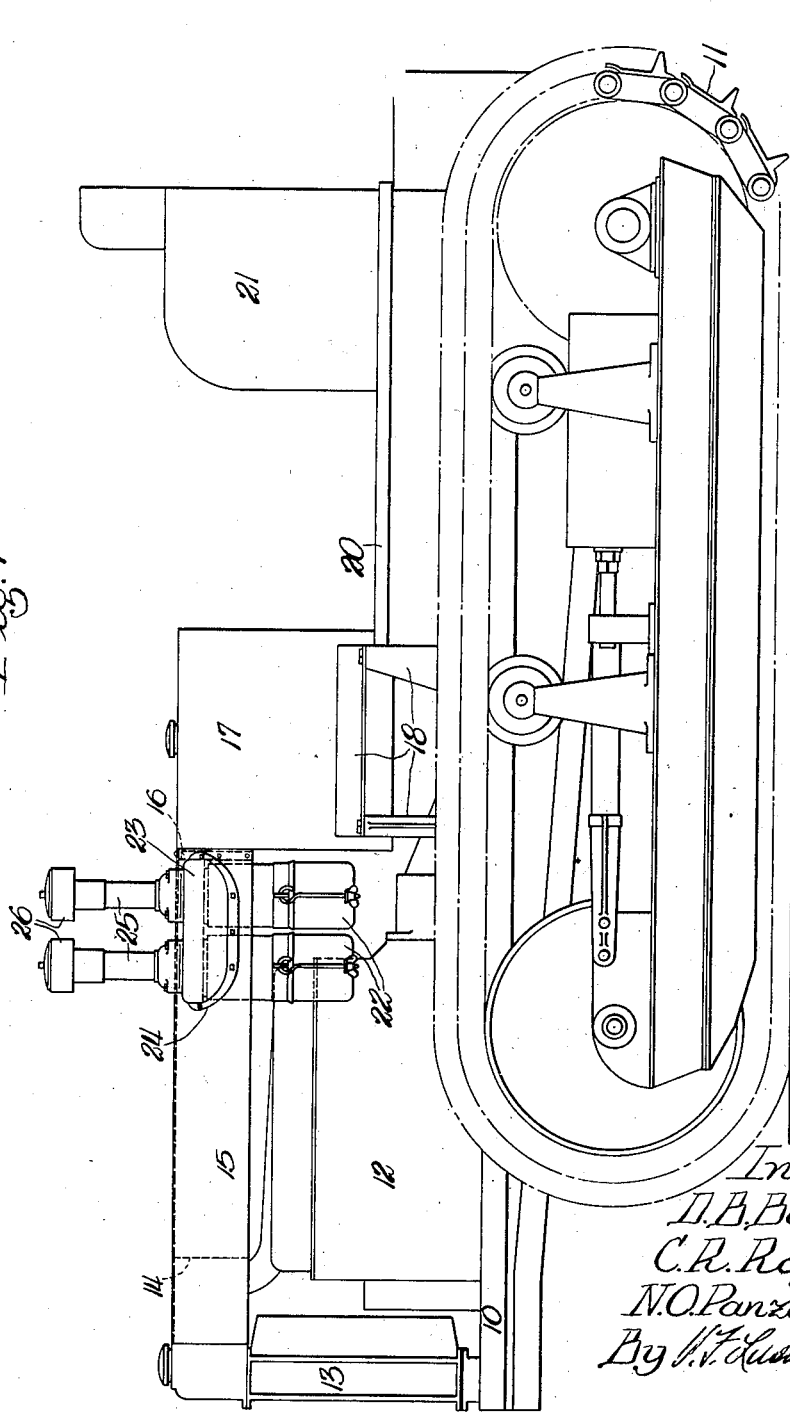
Figure 1 is a general side elevational view of a tractor, showing one form of the improved air cleaner assembly and mounting on the hood for the engine of the tractor.

In the form shown in Figures 1, 2 and 3, a pair of air cleaners 22, of the upright cylindrical type, are arranged side by side in longitudinal alignment to one side of the longitudinal median line of the hood 15 and at a location just in front of the front wall of the fuel tank 17 and adjacent the rear end of the motor 12, and slightly to one side thereof. Said two air cleaners are secured at their upper ends in a common header or hollow bracket 23 inserted into an elongated opening formed in the hood at the location mentioned, with the header having a skirt or flange 24 overlying the hood and securely fastened thereto, as shown. Each of the two air cleaners 22 has an individual, upstanding, air intake pipe 25 with a strainer cap 26 at the top ends thereof. These pipes 25 pass through the header 23 and respectively supply air into the two cleaners 22, said air, after passing therethrough and being freed of dirt particles, then coming out into the hollow header for delivery to a common clean air outlet pipe 27, from whence it is delivered to the engine for use therein. It can now be seen that such mounting of the air cleaners is independent of the motor. The specific location of the cleaners at the point mentioned, between the side edges of the hood, leaves such side edges unencumbered, so that good lines of vision for the operator from his seat are maintained. The hood is thus utilized to carry the weight of the air cleaners.

Another desirable arrangement for the cleaners is illustrated in Figures 4, 5 and 6, where it will be seen that the two cleaners are arranged side by side along a transverse line with one located on each side of the longitudinal median line of the hood and in the space between the rear end of the motor block and the front wall of the fuel tank. In carrying out this modification, the hood 15, at the point mentioned, is cut out to provide an opening, in which is secured, as by welding, an upright sheet metal sleeve or stack portion 28, as best shown in Figure 6, and securely fastened in said portion 28 is a modified header bracket 23' having a flange 24' bolted or otherwise secured to the stack portion 28, as shown. The pair of air cleaners is shown at 22', the same being arranged transversely side by side, as appears in Figures 4 and 6, and having their top ends secured in the common header bracket 23' in such a way that the cleaners are supported by the hood 15 and hang down in the space between the rear end of the engine block and the front wall of the fuel tank.

In this modified form, each cleaner 22' is provided with an individual, upstanding air intake pipe 25', which passes through the hollow manifold 23' to supply air separately to said cleaners 22'. The air cleaned by the two cleaners then enters the hollow manifold or header 23' to be passed out of a single outlet conduit 27' to be led to the engine for use therein. Each pipe 25' carries a strainer cap 26', as shown. Thus, it will be seen that the modification also provides an ideal mounting and location for a pair of air cleaners, which will not obstruct the sides of the hood, nor encumber or clutter up the engine.

The structures above described in detail achieve the desirable objects and purposes of the invention heretofore recited.

It is the intention to cover all changes and modifications of the illustrative examples disclosed which do not in material respects constitute departures from the spirit and scope of the invention, as hereinafter set forth in the claims.

What is claimed is:

1. A mounting for air cleaners or the like for an engine having a longitudinal hood thereover, the mounting comprising a hollow bracket carried in the hood, and at least a pair of air cleaners supported side by side in said bracket, said cleaners having individual air inlet pipes and a common clean air outlet pipe leading from the bracket.

2. A mounting for air cleaners or the like for an upright in-line type of engine covered by a hood, the mounting comprising a manifold bracket fastened to the hood in an opening provided therein, at least a pair of air cleaners carried by said bracket and provided with individual air inlet pipes extending above the hood with the cleaners arranged under the hood, said cleaners discharging cleaned air into the manifold, a common outlet from the manifold below the hood for all of the cleaners, and said cleaners being arranged in longitudinal alignment in said hood.

3. A mounting for air cleaners or the like for an upright in-line type of engine covered by a longitudinally disposed hood, the mounting comprising a manifold bracket fastened to the hood in an opening provided therein, at least a pair of air cleaners carried by said bracket and provided with individual air inlet pipes extending above the hood with the cleaners arranged under the hood, said cleaners discharging cleaned air into the manifold, a common outlet from the manifold below the hood for all of the cleaners, and said cleaners being arranged in transverse alignment in said hood.

4. A mounting for air cleaners or the like for an engine having a longitudinal hood thereover, the mounting comprising a hollow bracket carried in the hood, and at least a pair of air cleaners supported side by side in said bracket, said cleaners having individual air inlet pipes and a common clean air outlet pipe leading from the bracket, said bracket being of a shape to dispose said cleaners in longitudinal alignment along one side of the longitudinal median line of the hood.

5. A mounting for air cleaners or the like for an engine having a longitudinal hood thereover, the mounting comprising a bracket arranged in and fastened to the hood, an air cleaner carried by said bracket below the hood, and an air inlet pipe for the cleaner mounted in said bracket and extending upwardly above said hood.

6. A mounting for air cleaners or the like for an engine having a longitudinal hood thereover, the mounting comprising an elongated bracket disposed transversely in and secured to the hood across the longitudinal median line thereof, said bracket carrying below the hood a pair of air cleaners with one disposed on each side of said median line.

7. A mounting for air cleaners or the like for an engine having a longitudinal hood thereover, the mounting comprising an elongated bracket disposed longitudinally in and secured to the hood along one side of the longitudinal median line thereof, said bracket carrying two air cleaners side by side in longitudinal alignment.

8. An air cleaner mounting for an engine comprising a plurality of upright air cleaners arranged side by side, a hood covering the engine, and a bracket for carrying the cleaners from said hood, said cleaners having individual air intake pipes disposed above the hood and a common air outlet pipe disposed below the hood.

9. In an engine assembly comprising a longitudinal in-line engine having a radiator at its front end and a fuel tank at its rear, a hood carried by the radiator and tank over the engine, a bracket carried by the hood in an opening formed therein between the rear end of the engine and front end of the fuel tank, and an air cleaner carried at said location by the bracket independently of the engine.

10. In an engine assembly comprising a longitudinal in-line engine having a radiator at its front end and a fuel tank at its rear, a hood carried by the radiator and tank over the engine, said hood having an opening therein between the rear end of the engine and the front end of the tank, and a pair of air cleaners arranged side by side in said opening and having individual air inlet pipes extending above the hood and a common clean air outlet extending below the hood.

11. In an engine assembly comprising a longitudinal in-line engine having a radiator at its front end and a fuel tank at its rear, a hood carried by the radiator and tank over the engine, a manifold bracket carried in an opening formed in said hood at the rear of the engine and in advance of the tank, at least a pair of air cleaners carried by said bracket having upright individual air intake pipes extending above the hood with the cleaners hung below the hood, and a common air outlet pipe for said cleaners leading from said manifold bracket below said hood.

12. In an engine assembly comprising a longitudinal in-line engine having a radiator at its front end and a fuel tank at its rear, a hood carried by the radiator and tank over the engine, and a bracket carried by the hood at the rear of the engine and in advance of the tank, said bracket carrying at least a pair of air cleaners side by side in substantially longitudinal alignment to one side of the longitudinal median line of the hood.

13. In an engine assembly comprising a longitudinal in-line engine having a radiator at its front end and a fuel tank at its rear, a hood carried by the radiator and tank over the engine, and a bracket carried by the hood at the rear of the engine and in advance of the tank, said bracket carrying at least a pair of air cleaners side by side in substantially transverse alignment with the cleaners arranged equally in number in balanced relation on opposite sides of the longitudinal median line of the hood.

14. In an engine assembly comprising a longitudinal engine having a radiator at its front end and a narrow fuel tank at its rear end of less width than the radiator, and a hood for the engine carried by the radiator and tank, said hood being substantially as wide as the radiator at its front end and converging at its sides in a rearward direction to a width approximately the same as the width of the tank, the combination therewith of an air cleaner rigidly supported from the hood between the side edges thereof in advance of the tank and at the rear end of the engine.

15. In an engine assembly comprising a longitudinal engine having a radiator at its front end and a narrow fuel tank at its rear end of less width than the radiator, and a hood for the engine carried by the radiator and tank, said hood being substantially as wide as the radiator at its front end and converging at its sides in a rearward direction to a width approximately the same as the width of the tank, the combination therewith of a pair of side by side air cleaners arranged in parallel with individual air inlet pipes and a common air outlet pipe and carried rigidly from said hood at the rear of the engine in advance of the tank and between the side edges of the hood.

16. An air cleaner mounting for an engine having a hood thereover, said mounting comprising means for carrying the air cleaner entirely from said hood, said mounting means including an air intake pipe for the cleaner extending above the hood.

17. In combination with an engine having a support located thereabove, a pair of air cleaners rigidly carried by the support from a point above and independently of the engine, said cleaners having individual air inlet pipes and a common air outlet pipe.

18. In combination with an engine having a support located thereabove, said support having an opening therein, a header bracket extending through the opening, a flange on said header bracket secured to the support, an air cleaner secured to the header below the support, an air inlet pipe secured to the header above the support, and an air outlet pipe secured to the header below the support, said pipes communicating with the cleaner.

19. In combination with an engine having a support spaced therefrom, said support having an opening therein, a header bracket extending through the opening and including a flange formed on the header bracket and secured to the support, an air cleaner secured to the header bracket between the engine and the support and carried independently of the engine, an air inlet pipe secured to the header bracket outside the support, and an air outlet pipe secured to the header bracket between the engine and the support, said pipes communicating with the air cleaner.

20. In combination with an engine having a support spaced therefrom, said support having an opening therein, a header bracket extending through the opening, a flange on the header bracket secured to the support, at least a pair of air cleaners secured to the header bracket between the support and the engine, individual air inlet pipes secured to the header bracket outside the support and communicating respectively with the air cleaners through the header, and an air outlet pipe secured to the header bracket between the support and the engine and communicating with the air cleaners through the header.

DAVID B. BAKER.
CLIFFORD R. ROGERS.
NORMAN O. PANZEGRAU.